March 23, 1943.  S. C. OLSON  2,314,419
VEHICLE
Filed Jan. 13, 1942  3 Sheets-Sheet 2
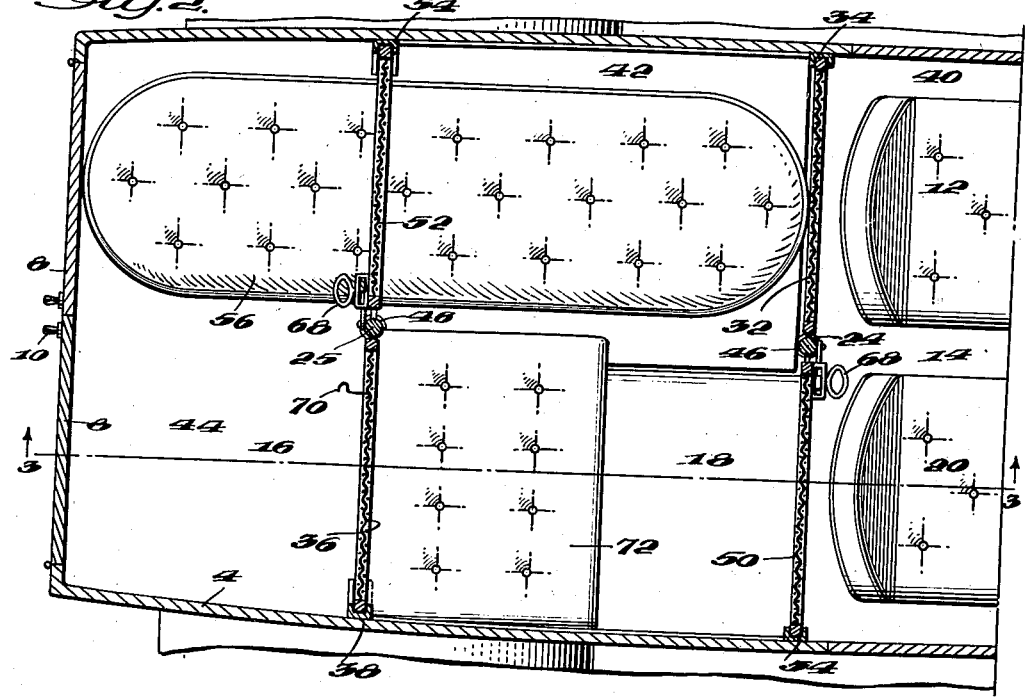
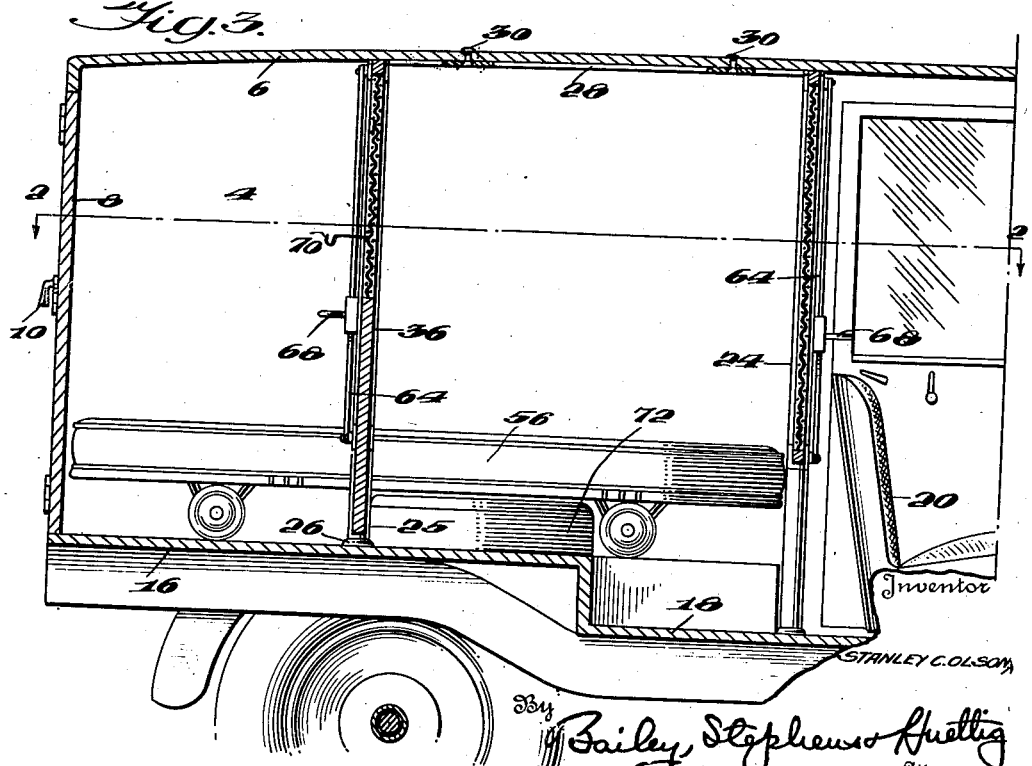
Inventor
STANLEY C. OLSON
By Bailey, Stephens & Huettig
Attorney

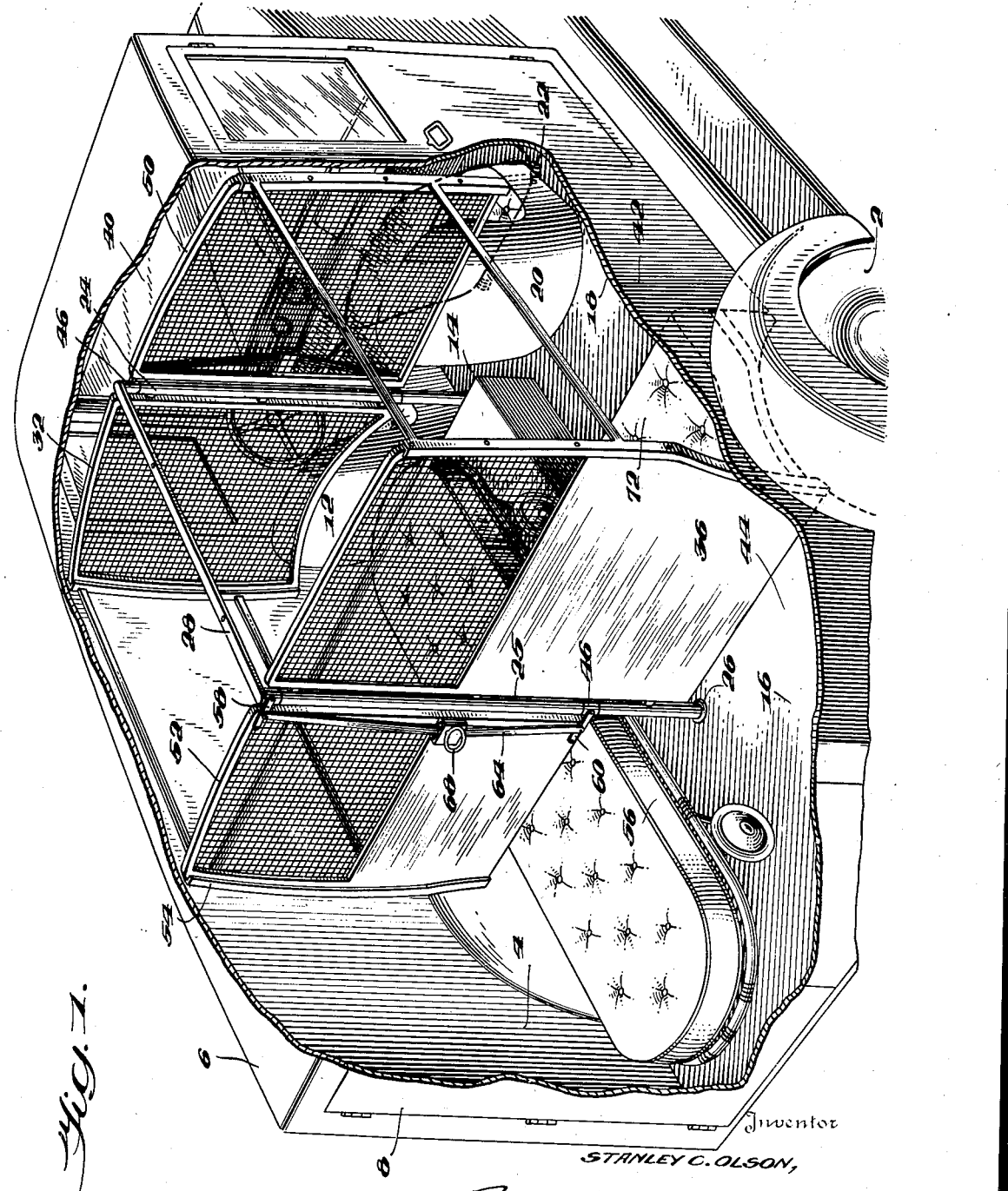

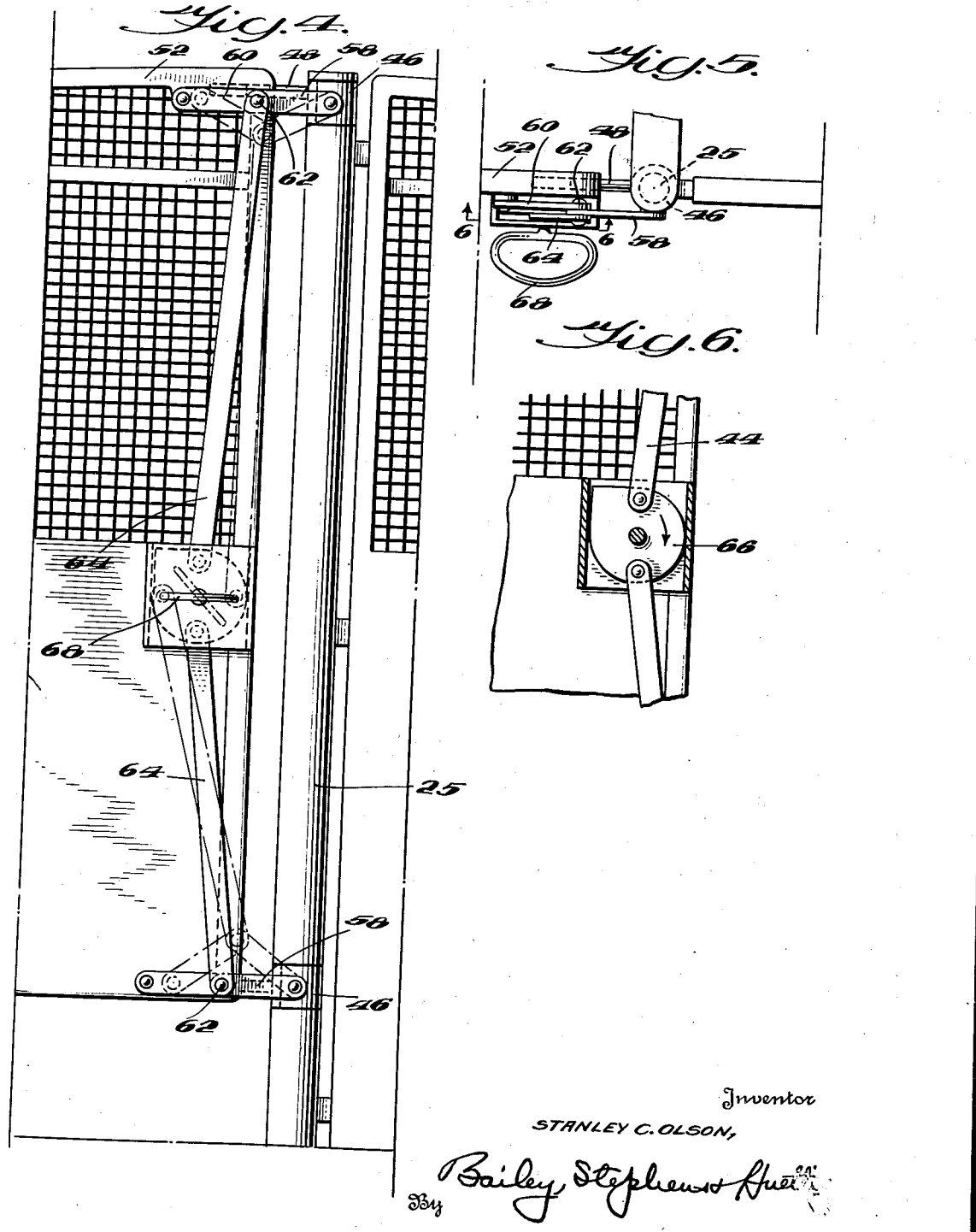

Patented Mar. 23, 1943

2,314,419

UNITED STATES PATENT OFFICE 2,314,419

VEHICLE

Stanley C. Olson, La Crosse, Wis.

Application January 13, 1942, Serial No. 426,621

8 Claims. (Cl. 296—19)

The invention relates to vehicles, and especially to vehicle bodies capable of various uses.

The primary object of the invention is to provide a vehicle capable of use either as an ambulance or as a police patrol car for carrying prisoners.

Another object of the invention is to provide a vehicle of this type which can be quickly and easily converted from one type of use to the other without the removal or replacement of any parts.

A further purpose of the invention is to provide a set of parts which can be inserted in an ordinary vehicle, such as a delivery truck, to convert it to use for either of the two purposes.

Still another object of the invention is to utilize, in a device of this type, a wheeled stretcher both as a stretcher, as a seat for a prisoner's compartment, and as a means to block the escape of a person from such compartment.

An additional object of the invention is to provide a construction of this type which permits access to an intermediate compartment both from the driver's compartment in the front and from an equipment compartment in the rear to an intermediate compartment, while allowing such access from within the intermediate compartment to be effectively prevented.

Still a further object of the invention is to provide a novel locking mechanism for the doors of an arrangement of this type.

Further objects and advantages of the invention will be seen from the following description when taken in conjunction with the accompanying drawings, which form a part thereof.

In the drawings:

Fig. 1 is a perspective view of a vehicle embodying my invention, with parts broken away;

Fig. 2 is a horizontal cross section on the line 2—2 of Fig. 3;

Fig. 3 is a vertical cross section on the line 3—3 of Fig. 2;

Figs. 4 and 5 are an elevation and a top plan view, respectively, of the door mounting; and Fig. 6 is a detail cross section on the line 6—6 of Fig. 5.

The invention is shown as applied to a panel truck, although it can clearly be applied to other types of vehicles. This truck has a suitable body mounted on wheels 2 and having side walls 4 and a top 6. The rear end is closed by hinged doors 8 having a catch mechanism 10 of conventional type. The driver's seat is shown at 12. This vehicle preferably has a front floor 14 which is at a lower level than the back floor 16, this dropped front floor having a rearward extension 18 behind the passenger's seat 20. However, the invention is also applicable to other types of floors. The passenger's seat 20 is preferably hinged at 22 so that it can be tilted forward to the dotted line position shown in Fig. 1.

According to the invention, I provide parts which may be detachably arranged within such a truck to convert it into a vehicle useful as a patrol wagon or ambulance, although these parts might form a permanent part of the structure. These parts include front and rear posts 24, 25 which can be secured at their bottom ends to the floor portion 16 centrally of the truck by flanges 26, and which are connected at their top ends by a bar 28 which can be secured to the top of the truck by bolts 30. A fixed wall or panel 32 extends from the front post 24 behind the driver's seat 12 to the left-hand side wall and is secured thereto at 34. This panel may be of heavy mesh wire or the like and need extend down only just below the top of the driver's seat. A fixed panel 36 extends from the rear post 25 to the right-hand wall and is secured thereto at 38. This panel extends from the floor to the top and may be formed in part of heavy wire mesh.

These two panels define in the truck body a front driver's compartment 40, an intermediate prisoner's compartment 42, and a rear equipment compartment 44.

Each of posts 24, 25 carries two or more rotatable sleeves 46. From these sleeves project radial pins 48. Front and rear doors 50, 52 have sockets which engage slidably on these pins, so that the doors can move radially towards or from the posts. These doors extend from the posts to the right- and left-hand walls, respectively. Running vertically along each wall is a U-shaped frame 54 adapted to receive the edge of a door.

The front door 50 is located behind the passenger's seat 20, and need only extend down a little below the top of this seat. The rear door 52 also terminates at some distance above the floor, this distance being just sufficient to permit a low wheeled stretcher 56 to extend beneath it from compartment 44 into compartment 42. Both doors may be formed at least in part of heavy wire mesh.

The doors 50, 52 are locked by the mechanism shown in detail in Figs. 4 to 6. This includes a toggle mechanism formed of links 58, 60 pivoted to the post and to the door, respectively, and pivoted to each other at 62. Two of these devices are provided on each door. To the pivots 62 are connected links 64 which are in turn pivoted to opposite points of a rotatably mounted disc 66 turnable by a handle 68. A hook 70 is provided for holding the rear door 52 in open position when desired.

This locking mechanism operates as follows: When the door is not locked, the handle 68 is in the position shown in dotted lines in Fig. 4, in which the toggle is broken, so that the door is drawn inwardly towards the post. When the door is to be locked, it is brought opposite the channel 54 and the disc 66 is turned to straighten the toggles. This causes the door to slide outwardly on the pins until its outer edge engages in the channel and is held thereby so that opening of the door is prevented.

A seat 72 may be provided in the compartment 42 to provide further seating space therein.

When the vehicle is to be used as a patrol wagon, the doors 50 and 52 are both locked in closed position. One or more prisoners or guards can then occupy the intermediate compartment, their escape being prevented by the passenger's seat 20 at the front and by the stretcher 56 beneath the rear door. The stretcher cannot be pushed out of the way since the rear doors 8 of the truck are closed and hold it in position. Thus, although the bottom of the door 52 is spaced from the floor, the stretcher blocks this space.

When the vehicle is to be used as an ambulance, the rear door 52 is held open by the hook 70. It is now possible for the stretcher to carry a patient, and a doctor or a nurse may occupy the seat 72. The stretcher may be removed by opening the back doors 8 of the truck.

While I have described the invention as applied to a panel truck, it is apparent that it can be applied to other types of vehicles, especially to those which have one or more doors or other closures through which a stretcher can be removed from the vehicle.

While I have described herein one embodiment of my invention, I wish it to be understood that I do not intend to limit myself thereby, except within the scope of the appended claims.

I claim:

1. In a vehicle body having side and top walls, means dividing said vehicle into a front driver's compartment, an intermediate compartment and a rear compartment, said means including at least one door between the intermediate compartment and the rear compartment to permit access therebetween, said door terminating at a distance above the floor sufficient to permit a stretcher to be inserted therebeneath.

2. In a vehicle body having side and top walls, means dividing said vehicle into a front driver's compartment, an intermediate compartment and a rear compartment, said means including at least one door between the intermediate compartment and the rear compartment to permit access therebetween, at least one opening into said rear compartment from the exterior of the vehicle, a closure for said opening, said door being of insufficient dimensions to prevent passage between the intermediate and rear compartments.

3. In a vehicle body having side and top walls, means dividing said vehicle into a front driver's compartment, an intermediate compartment and a rear compartment, said means including at least one door between the intermediate compartment and the rear compartment to permit access therebetween, at least one opening into said rear compartment from the exterior of the vehicle, a closure for said opening, said door being of insufficient dimensions to prevent passage between the intermediate and rear compartments, and a stretcher insertable through the space not closed by said door and held in position by said closure.

4. In a vehicle body having side and top walls, means dividing said vehicle into a front driver's compartment, an intermediate compartment and a rear compartment, said means including at least one door between the intermediate compartment and the rear compartment to permit access therebetween, said door terminating at a distance above the floor sufficient to permit a stretcher to be inserted therebeneath, and a door between said front and intermediate compartments to permit access therebetween.

5. In a vehicle body having side and top walls, means dividing said vehicle into a front driver's compartment, an intermediate compartment and a rear compartment, said means including a post secured at an intermediate point of the vehicle, between the intermediate and rear compartments, means extending from said post to one side wall for preventing access between the compartments, a door mounted for movement to a position extending between the post and the other side wall, said door terminating at a distance above the floor sufficient to permit a stretcher to be inserted therebeneath.

6. In a vehicle body having side and top walls, means dividing said vehicle into a front driver's compartment, an intermediate compartment and a rear compartment, said means including a post secured at an intermediate point of the vehicle, between the intermediate and rear compartments, means extending from said post to one side wall for preventing access between the compartments, a door mounted for movement to a position extending between the post and the other side wall, said door terminating at a distance above the floor sufficient to permit a stretcher to be inserted therebeneath, and means accessible from the rear compartment only to lock the door in such position.

7. In a vehicle body having top and side walls and at least one opening at the rear with a closure therefor, means dividing said vehicle into a front driver's compartment, an intermediate compartment and a rear compartment, said means including at least one door between the intermediate compartment and the rear compartment to permit access therebetween, said door terminating at a distance above the floor sufficient to permit a stretcher to be inserted through said opening and beneath said door to extend partially into the intermediate compartment.

8. In a vehicle body having top and side walls and at least one opening at the rear with a closure therefor, means dividing said vehicle into a front driver's compartment, an intermediate compartment and a rear compartment, said means including a post secured at an intermediate point of the vehicle, between the intermediate and rear compartments, means extending from said post to one side wall for preventing access between the compartments, a door mounted for movement to a position extending between the post and the other side wall, said door terminating at a distance above the floor sufficient to permit a stretcher to be inserted through said opening and beneath said door to extend partially into the intermediate compartment.

STANLEY C. OLSON.